United States Patent [19]

Cook

[11] Patent Number: 4,683,514
[45] Date of Patent: Jul. 28, 1987

[54] SURGE VOLTAGE PROTECTIVE CIRCUIT ARRANGEMENTS

[75] Inventor: Kenneth G. Cook, Middlesex, England

[73] Assignee: The M-O Valve Company Limited, England

[21] Appl. No.: 782,434

[22] Filed: Oct. 1, 1985

[30] Foreign Application Priority Data

Oct. 3, 1984 [GB] United Kingdom ............... 8424907
Apr. 19, 1985 [GB] United Kingdom ............... 8510051

[51] Int. Cl.⁴ ............................................... H02H 9/04
[52] U.S. Cl. ....................................... 361/91; 361/111; 361/119; 361/56
[58] Field of Search ................... 361/56, 91, 110, 111, 361/118, 119

[56] References Cited

U.S. PATENT DOCUMENTS 3,480,832 11/1969 Person .................................. 361/56
3,934,175 1/1976 Clark .................................... 361/56
4,271,445 6/1981 Hartman et al. ...................... 361/56
4,544,983 10/1985 Anderson et al. ................ 361/56 X
4,586,104 4/1986 Standler ............................ 361/56 X Primary Examiner—A. D. Pellinen
Assistant Examiner—Derek S. Jennings
Attorney, Agent, or Firm—Kirschstein, Kirschstein, Ottinger & Israel

[57] ABSTRACT

A circuit arrangement for protecting a load connected across a supply against surge voltage includes a gas-filled arrester connected in parallel with a semiconductor arrester across the load. A firing circuit is provided which is responsive to the breakdown of the semiconductor arrester to apply a voltage between a trigger electrode in the gas-filled arrester and another electrode within the gas-filled arrester to reduce the breakdown voltage of the discharge gap of the gas-filled arrester. The arrangement is operative for protection against surge voltages between the supply lines, and also between each line and earth.

2 Claims, 3 Drawing Figures

SURGE VOLTAGE PROTECTIVE CIRCUIT ARRANGEMENTS

BACKGROUND OF THE INVENTION

1. Field of the Invention

This invention relates to circuit arrangements. More particularly the invention relates to circuit arrangements for protecting a load connected across an electrical supply against surge voltages, the circuit arrangement incorporating a voltage arrester comprising a gas-filled enclosure housing a pair of electrodes which define between them a discharge gap. In use of such an arrangement the arrester is connected in parallel with the load across the electrical supply lines to the load or across one of the supply lines and an earth line, such that if a surge voltage greater than the breakdown voltage of the discharge gap appears on the supply, the arrester will strike a discharge, thus shortcircuiting the surge voltage and protecting the load.

2. Description of Related Art

As gas-filled excess voltage arresters do not normally strike at voltages of less than about 300 volts, for the protection of, for example, integrated circuits which may be damaged by voltage spikes of only a few tens of volts, it is usual to use a so-called hybrid circuit arrangement, including a second voltage arrester, normally a semiconductor arrester, connected in parallel with the gas-filled voltage arrester, the second arrester being arranged to break down at a somewhat lower voltage than the gas-filled arrester.

A problem arises, however, with known hybrid circuit arrangements where there is a sustained surge voltage which causes the semiconductor arrester to conduct, but is of insufficient magnitude to cause the voltage drop across a resistor and semiconductor arrester to reach the breakdown voltage of the discharge gap of the gas-filled arrester. The gas-filled arrester will then not strike a discharge, and the semiconductor arrester is likely to become overloaded and fail.

SUMMARY OF THE INVENTION

It is an object of the present invention to provide a circuit arrangement for protecting a load connected across an electrical supply against surge voltages wherein this problem is alleviated.

According to the invention a circuit arrangement for protecting a load connected across a supply against surge voltages comprises: a resistance connected in a line between the load and the supply; a first voltage arrester including a gas-filled enclosure housing two electrodes which define between them a discharge gap connected between said line on the supply side of said resistance and a further line between said load and said supply; a second excess voltage arrester of lower breakdown voltage than said discharge gap of said first arrester connected between said lines on the load side of said resistance, a trigger electrode within the enclosure of said first arrester; and firing means responsive to breakdown of said second arrester to apply a voltage between said trigger electrode and an electrode of said first arrester, thereby to reduce the breakdown voltage of said discharge gap of said first arrester.

BRIEF DESCRIPTION OF THE DRAWINGS

In order that the present invention may be more readily understood, a known circuit arrangement, and two embodiments of surge protection circuits according to the invention, will now be described by way of example and with reference to the accompanying drawings, in which.

DETAILED DESCRIPTION OF THE PREFERRED EMBODIMENTS

Figure 1:
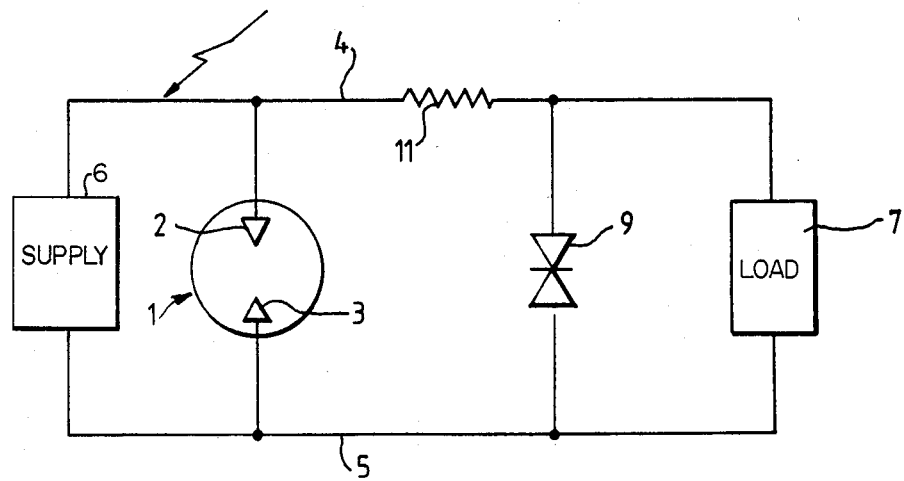
FIG. 1 is a circuit diagram of a known hybrid surge protection circuit arrangement in accordance with the prior art.

Referring to FIG. 1, the prior art arrangement comprises a gas-filled voltage arrester 1 having a gas-filled enclosure in which are housed two electrodes 2, 3 which define between them a discharge gap. External leads are provided to each of the electrodes 2, 3, each lead being connected to a respective one of a pair of electrical supply lines 4, 5 extending between a load 7 to be protected and a supply 6. Also connected across the supply lines 4, 5 is a semiconductor arrester 9. A resistor 11 is connected in one of the supply lines 4 between the gas-filled excess voltage arrester 1 and semiconductor arrester 9, the semiconductor arrester being on the load side of the resistor 11.

In operation, when a surge voltage appears between the supply lines 4, 5 which causes the semiconductor arrester 9 to conduct, the total voltage drop across the resistor 11 and semiconductor arrester 9 is usually sufficient to exceed the breakdown voltage of the discharge gap between the electrodes 2 and 3, thus causing the gas-filled excess voltage arrester 1 to strike and thus conduct the major part of the surge current. Thus the voltage applied to the load 7 will not exceed the breakdown voltage of the semiconductor arrester 9, and the semiconductor arrester 9 will not have to conduct the full surge current which may be in the region of kiloamps in the case of, for example, a lightning impulse, semiconductor arresters having limited surge current capability.

Figure 2:
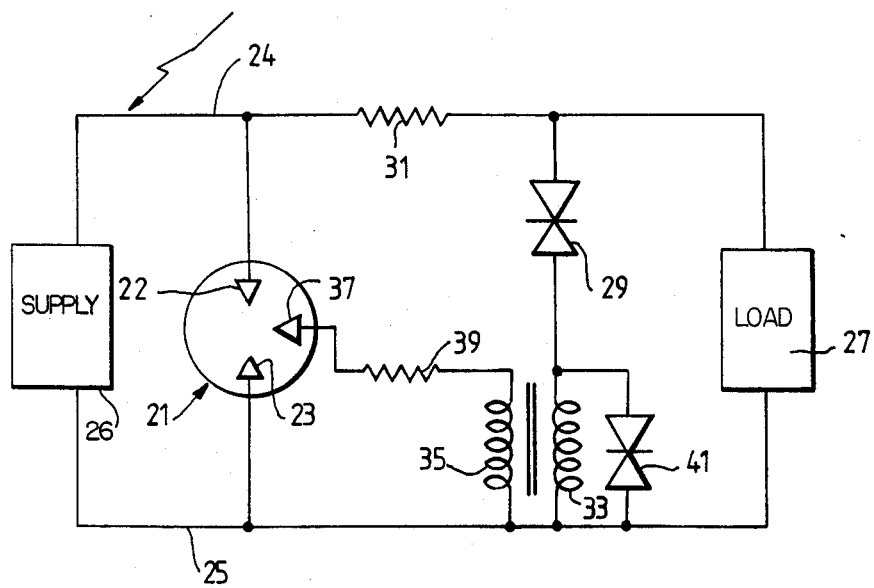
FIG. 2 is a circuit diagram of a first embodiment of a hybrid surge protection circuit arrangement according to the invention.

Referring now to FIG. 2, the first embodiment of the invention includes a gas-filled voltage arrester 21 comprising a gas-filled enclosure in which are housed two electrodes 22, 23 which define between them a discharge gap. An external lead is provided to each electrode 22, 23, the leads being connected to respective ones of a pair of lines 24, 25 extending between the load 27 to be protected and a supply 26. Also connected across the supply lines 24, 25 is a semiconductor arrester 29. A resistor 31 is connected in one of the supply lines 24 between the gas-filled excess voltage arrester 21 and semiconductor arrester 29, the arrester 29 being on the load side of the resistor 31.

As so far described, the circuit arrangement is the same as the known hybrid circuit arrangement described with reference to FIG. 1. The circuit arrangement shown in FIG. 2 is however distinguished from this known arrangement in that the primary winding 33 of a step up transformer is connected in series with the semiconductor arrester 29 between the supply lines 24, 25, a secondary winding of the transformer being connected between the supply line 25 and a trigger electrode 37 located within the enclosure of the gas-filled excess voltage arrester 21 via a limiting resistor 39. A further semiconductor arrester 41 is connected in parallel with the primary winding 33.

In operation, when a voltage surge appears between the lines 24, 25 of sufficient magnitude to cause the semiconductor arrester 29 to conduct, but of insufficient magnitude to fire the arrester 21, the resulting current flowing through the primary winding 33 of the step up transformer causes a sufficiently high voltage to be applied between the trigger electrodes 37 and the electrode 23 of the gas-filled excess voltage arrester 21 through the limiting resistor 39 to cause the arrester 21 to strike a discharge between the electrodes 37 and 23 followed by a sympathetic discharge between the electrodes 22 and 23. The majority of the current of the voltage surge will then flow between the electrodes 22 and 23, thus preventing the semiconductor arrester 29 from burning out. The semiconductor arrester 41 ensures that the inductive voltage drop across the primary winding 33 of the transformer can not exceed the breakdown voltage of the semiconductor arrester 41, even when the rate of rise of the incoming voltage surge is very high. Thus the voltage applied across the load 27 can not exceed the sum of the breakdown voltages of the two semiconductor arresters 29 and 41.

In a typical arrangement the semiconductor arrester 29 is arranged to breakdown at 50 volts, and a voltage of 500 volts then appears across the secondary winding 35 of the transformer which is applied through the limiting resistor 39 between the trigger electrode 37 and electrode 23 to cause the arrester 21 to fire if a voltage of 100 or more volts exists between electrodes 22 and 23.

It will be appreciated that whilst the circuit arrangement described above by way of example uses a gas-filled voltage arrester having a single pair of main electrodes defining a discharge gap connected across a single pair of lines, in other arrangements in accordance with the invention a gas-filled arrester having two or more discharge gaps connected between respective pairs of supply lines may be used, a trigger electrode and firing means being provided to reduce the breakdown voltage of each such discharge gap.

Figure 3:
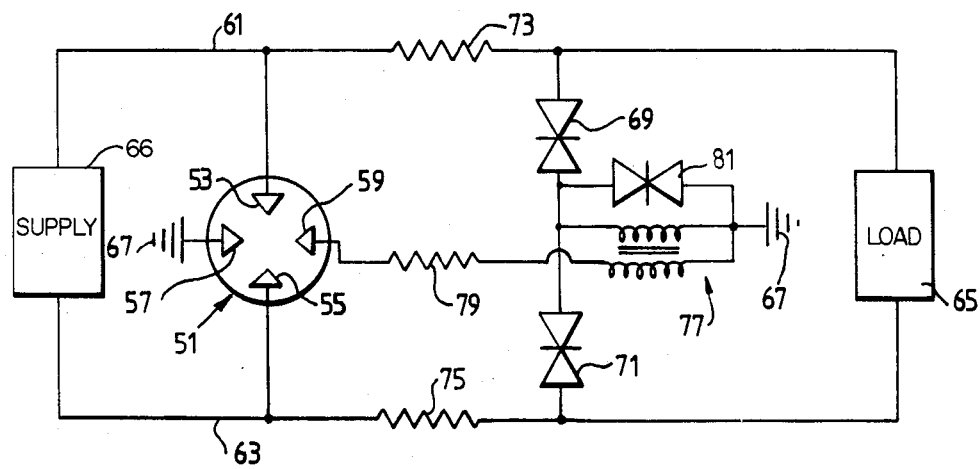
FIG. 3 is a similar diagram of a second embodiment.

FIG. 3 shows an example of such a circuit arrangement. Referring to this Figure, the arrangement includes a gas-filled voltage arrester 51 comprising a gas-filled enclosure in which are housed four electrodes 53, 55, 57, 59. A respective external lead is provided to each of the electrodes, the electrodes 53 and 55 being connected via their respective leads to a respective one of a pair of lines 61, 63 extending between the load 65 to be protected and a supply 66. The electrode 57 is connected via its respective lead to an earth line 67, the fourth electrode 59 being a trigger electrode as further described hereafter.

Thus the electrodes 53, 55, 57 define three discharge gaps these being between line and line, and each of the lines 61, 63 and the earth line 67.

Also connected across the supply lines 61, 63 is a series arrangement of two semiconductor arresters 69, 71. A respective resistor 73 or 75 is connected in each of the supply lines 61, 63 between the arrester 51 and the series arrangement of arresters 69, 71. The primary winding of a step-up transformer 77 is connected between the earth line 67 to the junction between the arresters 69, 71, a secondary winding of the transformer being connected in series with limiting resistor 79 between the trigger electrode 59 of the arrester 51 and earth. A further semiconductor arrester 81, is connected in parallel with the primary winding of the transformer 77.

The arrangement operates in equivalent fashion to the arrangement described in relation to FIG. 2. Voltage surges appearing between lines 61 and 63 or lines 61 and 67 or lines 63 and 67 which are of sufficient magnitude to cause the arrester 69 or 71 as relevant to fire, but of insufficient magnitude to strike a discharge between electrodes 53 and 55, or 53 and 57 or 55 and 57 respectively will cause current to flow through the primary of the transformer 77. A sufficiently high voltage will then be applied between the trigger electrode 59 and the relevant electrode 53 and 55 to cause the arrester 51 to strike a discharge between the trigger electrode and the relevant electrode 53 or 57, thus being followed by a sympathetic discharge between the electrodes 53 and 55, or 53 and 57, or 55 and 57. Thus, as in the arrangement described in relation to FIG. 2, the majority of the current of the voltage surge will flow in the gas-filled arrester, preventing the semiconductor arrester 69 or 71 from burning out. The semiconductor arrester 81 ensures that voltage drop between either of the lines 61 and 63 and earth can not exceed the sum of the breakdown voltages of the two semiconductor arresters 69 and 81 or 71 and 81.

I claim:

1. An electrical circuit arrangement for protecting a load connected across an electrical supply against surge voltages, comprising:
   (a) a resistance connected in one of a pair of supply lines which run from an electrical supply to a load, said resistance having a supply side and a load side;
   (b) a first voltage arrester including a gas-filled enclosure in which two main electrodes and a trigger electrode are housed, said main electrodes being spaced apart to form a discharge gap having a predetermined breakdown voltage, one of the main electrodes being connected to the supply side of the resistance in said one supply line, and the other of the main electrodes being connected to the other of the supply lines;
   (c) a second excess voltage semiconductor arrester having a breakdown voltage lower than said predetermined breakdown voltage, said second arrester being connected between the load side of the resistance in said one supply line and said other supply line;
   (d) firing means operative in response to breakdown of the second arrester, for applying a voltage between the trigger electrode and one of the main electrodes of the first arrester to thereby reduce the predetermined breakdown voltage,
   said firing means including a step-up transformer having a first winding connected in series with the second arrester, and a second winding in series with the trigger electrode; and
   (e) a third arrester being connected in parallel with the first winding.

2. An electrical circuit arrangement for protecting a load connected across an electrical supply against surge voltages, comprising:
   (a) a resistance connected in one of a pair of supply lines which run from an electrical supply to a load, said resistance having a supply side and a load side;
   (b) a first voltage arrester including a gas-filled enclosure in which three main electrodes and a trigger electrode are housed, said three main electrodes being mutually spaced apart to form three discharge gaps having predetermined breakdown voltages, a first of the main electrodes being connected to the supply side of the resistance in said one supply line, a second of the main electrodes being connected to the other of the supply lines, and a third of the main electrodes being connected to earth ground;

(c) a second and a third excess voltage semiconductor arrester having breakdown voltages lower than said predetermined breakdown voltages, said second and third arresters being connected in series with each other and being interconnected at a junction, said second and third arresters being connected between the load side of the resistance in said one supply line and said other supply line;

(d) firing means operative in response to breakdown of the second and third arresters, for applying a voltage between the trigger electrode and one of the main electrodes of the first arrester to thereby reduce the predetermined breakdown voltage associated with said one main electrode, said firing means including a step-up transformer having a primary winding connected between said junction and said earth ground, and a secondary winding connected between the trigger electrode and the earth ground; and (e) a fourth semiconductor arrester being connected in parallel with the primary winding.

* * * * *